(12) United States Patent
Hamaoka et al.

(10) Patent No.: US 10,253,681 B2
(45) Date of Patent: Apr. 9, 2019

(54) ENGINE DEVICE

(71) Applicant: YANMAR CO., LTD., Osaka (JP)

(72) Inventors: Shunji Hamaoka, Osaka (JP);
Fumihiro Nishimura, Osaka (JP);
Tetsuya Yokoyama, Osaka (JP)

(73) Assignee: Yanmar Co., Ltd., Osaka-shi (JP)

( * ) Notice: Subject to any disclaimer, the term of this patent is extended or adjusted under 35 U.S.C. 154(b) by 92 days.

(21) Appl. No.: 15/031,035

(22) PCT Filed: Oct. 22, 2014

(86) PCT No.: PCT/JP2014/078130
§ 371 (c)(1),
(2) Date: Apr. 21, 2016

(87) PCT Pub. No.: WO2015/064451
PCT Pub. Date: May 7, 2015

(65) Prior Publication Data
US 2016/0252008 A1    Sep. 1, 2016

(30) Foreign Application Priority Data
Oct. 28, 2013    (JP) .................................. 2013-223637

(51) Int. Cl.
*F02B 33/44*    (2006.01)
*F02B 29/04*    (2006.01)
(Continued)

(52) U.S. Cl.
CPC .......... *F02B 37/004* (2013.01); *F02B 37/013* (2013.01); *F02B 67/10* (2013.01);
(Continued)

(58) Field of Classification Search
CPC ...... F02B 37/004; F02B 37/013; F02B 67/10; F02B 29/0462; F02M 26/08; F02M 26/32;
(Continued)

(56) References Cited

U.S. PATENT DOCUMENTS 4,032,262 A * 6/1977 Zehnder .................. F02B 37/00
60/612
4,196,593 A    4/1980 Froeliger
(Continued)

FOREIGN PATENT DOCUMENTS

CN    201908715 U  *  7/2011
CN    202338390 U     7/2012
(Continued)

OTHER PUBLICATIONS

An English Machine Translation copy to Songen (Pub.No. JP 3169243 U), published on Jul. 21, 2011.*

*Primary Examiner* — Thai Ba Trieu
(74) *Attorney, Agent, or Firm* — Norton Rose Fulbright US LLP

(57) ABSTRACT

An engine device which can simplify a supply air cooling structure of an engine as well as simplifying a support structure of a first supercharger and a second supercharger. In an engine device in which the first supercharger and the second supercharger are arranged in series in an exhaust gas discharge channel of the engine, the first supercharger and the second supercharger are arranged in one side surface of the engine, the second supercharger is arranged so as to be close to the one side surface of the engine, and the first supercharger is arranged so as to be away from the one side surface of the engine.

20 Claims, 15 Drawing Sheets

(51) Int. Cl.
  *F02B 33/00* (2006.01)
  *F02B 37/00* (2006.01)
  *F02B 37/013* (2006.01)
  *F02B 67/10* (2006.01)
  *F02M 35/10* (2006.01)
  *F02M 26/08* (2016.01)
  *F02M 26/09* (2016.01)
  *F02M 26/32* (2016.01)

(52) U.S. Cl.
  CPC ............ *F02M 26/08* (2016.02); *F02M 26/09* (2016.02); *F02M 26/32* (2016.02); *F02M 35/10157* (2013.01); *F01N 2590/02* (2013.01); *Y02T 10/144* (2013.01)

(58) Field of Classification Search
  CPC .......... F02M 35/10157; F01N 2590/02; Y02T 10/144
  USPC ............................ 60/612, 599; 123/562–563
  See application file for complete search history.

(56) References Cited

U.S. PATENT DOCUMENTS

| | | | | |
|---|---|---|---|---|
| 4,344,289 | A * | 8/1982 | Curiel | F02B 37/013 60/612 |
| 6,802,184 | B2 * | 10/2004 | Huter | F02B 37/013 60/612 |
| 7,287,379 | B2 * | 10/2007 | Gobert | F02B 37/013 60/612 |
| 7,302,800 | B2 * | 12/2007 | Klingel | F02B 37/013 60/612 |
| 7,600,380 | B2 * | 10/2009 | Grissom | F02B 37/013 60/612 |
| 7,703,284 | B2 * | 4/2010 | Becker | F02B 37/013 123/562 |
| 8,534,066 | B2 * | 9/2013 | Cavallo | F02B 37/013 123/562 |
| 2007/0209611 | A1 * | 9/2007 | Buck | F01L 1/146 123/41.31 |
| 2009/0114171 | A1 * | 5/2009 | Hayashi | F01P 3/02 123/41.44 |
| 2011/0185724 | A1 * | 8/2011 | Barth | F02B 37/013 60/612 |
| 2013/0199162 | A1 * | 8/2013 | Schlemmer-Kelling | F02B 37/013 60/278 |
| 2014/0369863 | A1 * | 12/2014 | Hibino | F02B 37/013 417/243 |
| 2015/0176454 | A1 * | 6/2015 | Dreves | F02B 37/013 60/612 |
| 2016/0090902 | A1 * | 3/2016 | Svihla | F02B 37/013 60/599 |

FOREIGN PATENT DOCUMENTS

| | | | |
|---|---|---|---|
| CN | 205206934 U * | 5/2016 | |
| DE | 202010007768 U1 | 8/2010 | |
| DE | 10 2013 006 302 | 10/2014 | |
| EP | 2196659 A1 * | 6/2010 | ........... F02B 37/013 |
| EP | 2415989 A1 | 2/2012 | |
| JP | 53-70214 | 6/1978 | |
| JP | 56-173722 U | 12/1981 | |
| JP | 6-66146 | 3/1994 | |
| JP | 2005-299393 A | 10/2005 | |
| JP | 3169243 | 7/2011 | |
| JP | 2014-206168 | 10/2014 | |
| KR | 2013-0096263 A | 8/2013 | |
| WO | WO 2010076383 A1 * | 7/2010 | ......... F02B 29/0412 |
| WO | WO-2012/016712 | 2/2012 | |
| WO | WO 2012123629 A1 * | 9/2012 | ........... F02B 37/013 |
| WO | 2013087990 A1 | 6/2013 | |

* cited by examiner

ENGINE DEVICE

TECHNICAL FIELD

The present invention relates to an engine device which is mounted to a marine vessel, and more particularly to an engine device provided with a two-stage supercharger (a high-pressure supercharger and a low-pressure supercharger) which efficiently burns fuel.

BACKGROUND OF THE INVENTION

Conventionally, for example, in a prior art document, there is a technique that an improvement of a combustion efficiency is achieved by providing a high-pressure supercharger and a low-pressure supercharger in an engine device and making a boost pressure of the engine higher while suppressing increase of a supply air temperature in the engine (refer, for example, to Patent Document 1 and Patent Document 2).

Patent Literature

Patent Document 1: Japanese Unexamined Patent Publication No. H06-66146
Patent Document 2: WO2012/016712

SUMMARY OF INVENTION

In a structure in which a high-pressure supercharger or an aftercooler is mounted to a top surface of the engine such as the patent document 1, an installation height of the engine is enlarged, and there is a problem that the structure cannot be easily mounted to a marine vessel in which the installation height of the engine is limited. Further, in a structure in which the high-pressure supercharger and the low-pressure supercharger are separately arranged in facing side surfaces of the engine such as the patent document 2, the installation height of the engine can be compact, and a maintenance of each of the superchargers can be easily performed. On the other hand, there is a problem that an exhaust pipe or an air supply pipe for connecting the supercharger tends to protrude out of a side surface portion in one side of an engine block toward an outer side, and the piping structure of the exhaust pipe or the air supply pipe cannot be made compact because the exhaust pipe and the air supply pipe are arranged so as to be biased to the side surface portion in the one side of the engine block in which the exhaust manifold is installed. Further, since it is necessary to arrange an auxiliary component such as an engine control portion or an engine oil cooler in a side surface portion in the other side of the engine block, the auxiliary component are arranged so as to be close to an drive operation place of the engine, so that there is a problem that a movement of an operator tends to be limited.

An object of the present invention is to provide an engine device to which an improvement is applied as a result of making a study of the actual condition as mentioned above.

An engine device according to the invention of a first aspect is an engine device comprising a first supercharger, a second supercharger, and the first supercharger and the second supercharger being arranged in series in an exhaust gas discharge channel of an engine, wherein the first supercharger and the second supercharger are arranged in one side surface of the engine, the second supercharger is arranged so as to be close to the one side surface of the engine, and the first supercharger is arranged so as to be away from the one side surface of the engine.

The invention according to a second aspect is the engine device described in the first aspect, wherein a vertical portion of a supercharger unit frame is bonded and fixed to the one side surface of the engine, and the first supercharger and the second supercharger are attached to a top surface side of a horizontal portion of the supercharger unit frame.

The invention according to a third aspect is the engine device described in the first aspect, further comprising an intercooler which lowers a supply air temperature of the first supercharger and the second supercharger, wherein a vertical portion of a supercharger unit frame is bonded and fixed to the one side surface of the engine, and the intercooler is attached to a lower surface side of a horizontal portion of the supercharger unit frame.

The invention according to a fourth aspect is the engine device described in the second aspect, further comprising an exhaust pipe which derives exhaust gas of the engine to the first supercharger, wherein one and portion of the horizontal portion of the supercharger unit frame is connected in an L-shaped manner to an upper end side of the vertical portion of the supercharger unit frame, a cradle frame is firmly fixed to a top surface side of the horizontal portion of the supercharger unit frame to which the vertical portion of the supercharger unit frame is connected, the second supercharger is mounted on the cradle frame, and the exhaust pipe is extended between the horizontal portion of the supercharger unit frame and the cradle frame.

The invention according to a fifth aspect is the engine device described in the first aspect, wherein an exhaust pipe between the engine and the first supercharger, and a cooling water piping are extended in parallel to one side of head covers.

According to the invention of the first aspect, in the engine device comprising the first supercharger, the second supercharger, and the first supercharger and the second supercharger being arranged in series in the exhaust gas discharge channel of the engine, the first supercharger and the second supercharger are arranged in one side surface of the engine, the second supercharger is arranged so as to be close to the one side surface of the engine, and the first supercharger is arranged so as to be away from the one side surface of the engine. As a result, the second supercharger which is larger in size and is heavier than the first supercharger can be stably installed between the engine and the first supercharger, and it is possible to simplify the structure for supporting the first supercharger and the second supercharger. In addition, the supply air cooling piping in the side of the first supercharger having the higher supply air temperature can be installed so as to be away from the one side surface of the engine, and the supply air cooling piping in the second supercharger side having the lower supply air temperature can be supported so as to be close to the one side surface of the engine. As a result, it is possible to simplify the supply air cooling structure of the engine. It is possible to collectively attach an auxiliary component such as a cooling water circulation pump or an engine oil circulation pump to a lower side space of each of the superchargers, and it is possible to improve a maintenance workability of each of the auxiliary components.

According to the invention of the second aspect, the vertical portion of the supercharger unit frame is bonded and fixed to the one side surface of the engine, and the first supercharger and the second supercharger are attached to the top surface side of the horizontal portion of the supercharger unit frame. As a result, the second supercharger can be arranged in the top surface side near the vertical portion of the supercharger unit frame among the top surface side of the horizontal portion of the supercharger unit frame, and it is possible to simplify the structure body for supporting the supercharger unit frame while securing a support rigidity of the first supercharger and the second supercharger.

According to the invention of the third aspect, the invention is provided with the intercooler which lowers the supply air temperature of the first supercharger and the second supercharger, the vertical portion of the supercharger unit frame is bonded and fixed to the one side surface of the engine, and the intercooler is attached to the lower surface side of the horizontal portion of the supercharger unit frame. As a result, the one side surface of the intercooler can be faced to the one side surface of the engine as the vertical portion of the supercharger unit frame being therebetween, a part of the supercharger unit frame can be utilized as a piping which connects an intake manifold of the engine and a fresh air outlet of the intercooler, and it is possible to easily achieve simplification of the intake piping or reduction of an intake air resistance.

According to the invention of the fourth aspect, the invention is provided with the exhaust pipe which derives the exhaust gas of the engine to the first supercharger, the one end portion of the horizontal portion of the supercharger unit frame is connected in the L-shaped manner to the upper end side of the vertical portion of the supercharger unit frame, the cradle frame is firmly fixed to the top surface side of the horizontal portion of the supercharger unit frame to which the vertical portion of the supercharger unit frame is connected, the second supercharger is mounted on the cradle frame, and the exhaust pipe is extended between the horizontal portion of the supercharger unit frame and the cradle frame. As a result, it is possible to form the exhaust pipe for connecting the first supercharger to the engine linearly, it is possible to reduce an exhaust gas resistance between the engine and the first supercharger, and it is possible to simply structure an exhaust conduit between the engine and the first supercharger.

According to the invention of the fifth aspect, the exhaust pipe between the engine and the first supercharger, and the cooling water piping are extended in parallel to the one side of the head covers. As a result, it is possible to easily install, for example, an oil filter or an oil cooler by utilizing the engine side surface in the one side of the head covers in which the exhaust pipe and the cooling water piping are arranged as well as the exhaust pipe and the cooling water piping can be compactly installed to the one side of the head covers. It is possible to arrange each of a fuel pump arrangement room, an engine control panel, a start and stop switch box and an engine start device in an engine side surface in the other side of the head covers, and it is possible to easily secure a working space for starting or stopping the engine.

DESCRIPTION OF THE PREFERRED EMBODIMENTS

A description will be given below of an embodiment specifying the present invention with reference to the drawings in the case that the embodiment is applied to a diesel engine of a power generator which is mounted to a marine vessel.

Figure 1:
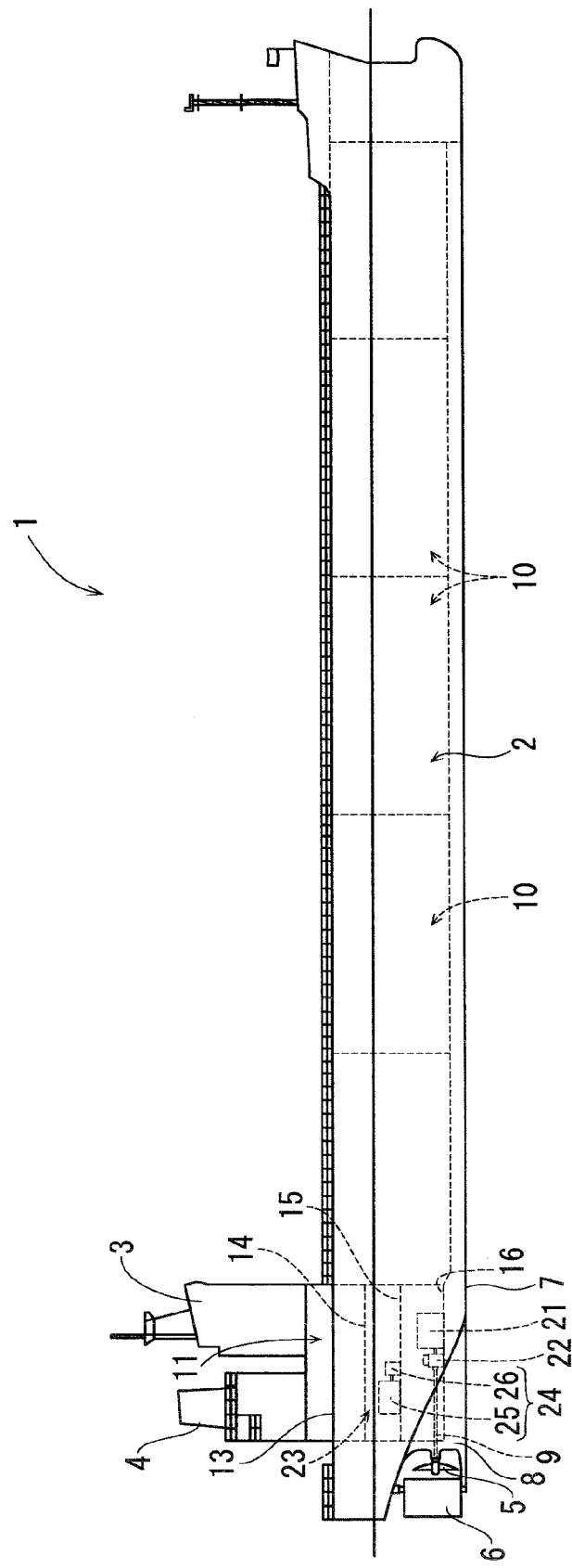
FIG. 1 is an overall side elevational view of a marine vessel.
Figure 2:
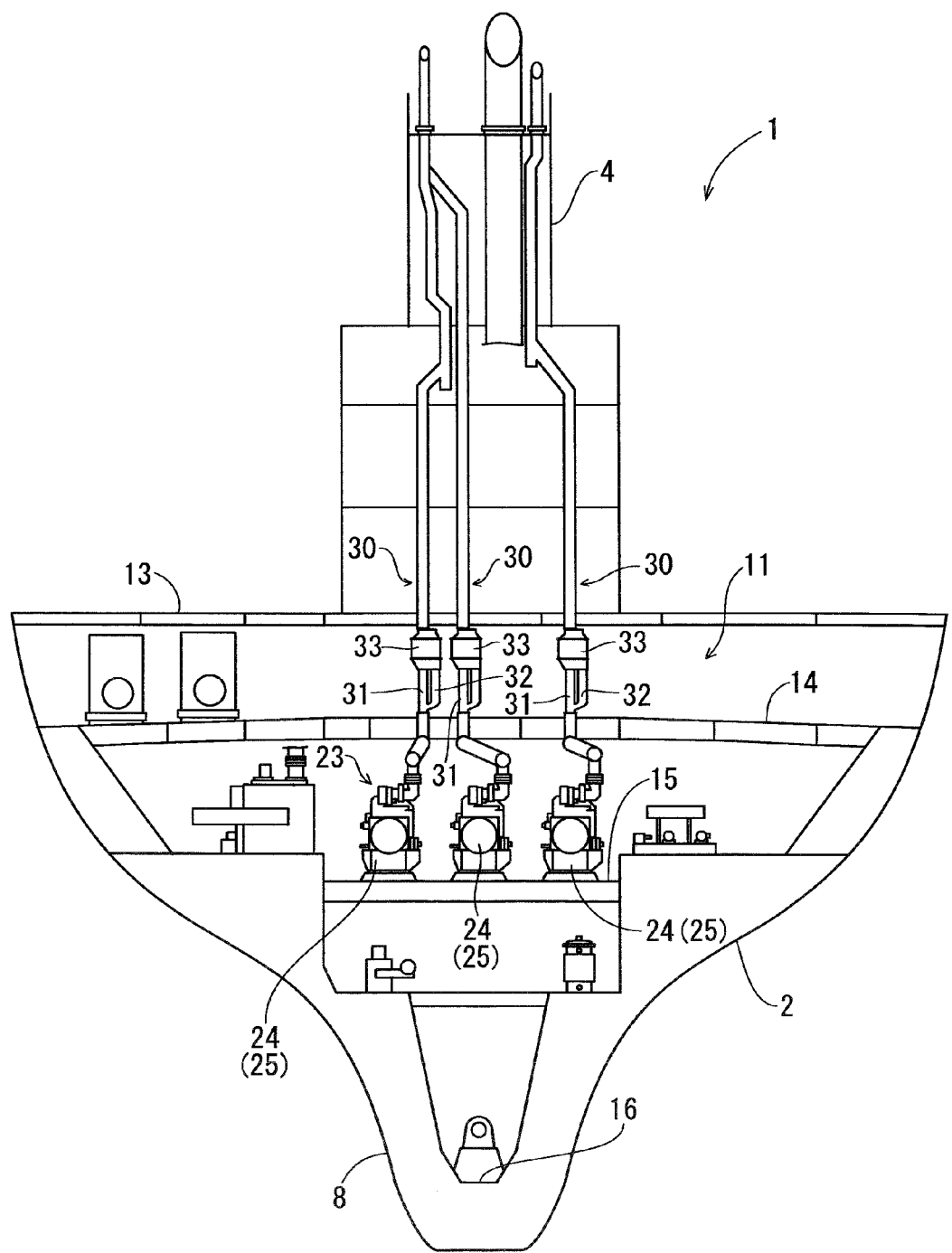
FIG. 2 is a vertical cross sectional view of FIG. 1.

First of all, a description will be given of an outline of a marine vessel 1 to which a diesel engine is mounted, with reference to FIGS. 1 and 2. As shown in FIGS. 1 and 2, the marine vessel 1 is provided with a hull 2, a cabin 3 (a bridge) which is provided in a stern side of the hull 2, a funnel 4 (chimney) which is arranged in a rear side of the cabin 3, and a propeller 5 for propelling and a rudder 6 for steering which are provided in a back lower portion of the hull 2. Further, a stern skeg 8 is integrally formed on a bottom 7 in the back lower portion of the hull 2, the bottom 7 is provided with a propeller shaft 9 which rotationally drives the propeller 5 for propelling, and the propeller shaft 9 is axially supported to the stern skeg 8. A bulk 10 is provided in a bow side and a center portion within the hull 2. An engine room 11 is provided in a stern side within the hull 2.

In the engine room 11, there are arranged a diesel engine 21 serving as a main engine which is a drive source of the propeller 5, a speed reduction gears 22, and a power generation device 23 for supplying an electric power to an electric system within the hull 2. The propeller 5 is rotationally driven by a rotary power via the speed reduction gears 22 from the main engine 21. An inner portion of the engine room 11 is compared into upper and lower sections by an upper deck 13, a second deck 14, a third deck 15 and an inner bottom plate 16. The main engine 21 and the speed reduction gears 22 are installed on the inner bottom plate 16 in the lowermost stage of the engine room 11, and the power generation device 23 is installed on the third deck 15 in a middle stage of the engine room 11. Here, the bulk 10 is divided into a plurality of compartments.

As shown in FIG. 2, the power generation device 23 is provided with three diesel power generators 24. The diesel power generator 24 is constructed by combining a six-cylinder power generating diesel engine 25 serving as an auxiliary machine, and a power generator 26 which generates power by driving the diesel engine 25. The three diesel power generators 24 are operated depending on a necessary electric energy. All the diesel power generators 24 are operated in the case of a large amount of electric power consumption (for example, at the time of sailing), and three diesel power generators 24 are selectively operated in the case that the electric power consumption is comparatively small (for example, at the berthing time), thereby supplying the generated electric power to each of the electric systems within the hull 2 from the power generator 26 of each of the diesel power generators 24.

Further, as shown in FIG. 2, an exhaust gas discharge pipe 30 of the diesel engine 25 in each of the diesel power generators 24 is communicated with an external portion via the funnel 4. Three diesel engines 25 are installed for generating power, and three exhaust gas discharge pipes 30 exist for the diesel engines 25. The exhaust gas discharge pipe 30 of each of the diesel engines 25 is provided with a main channel 31 which extends to the funnel 4, a bypass channel 32 which is branched from a midstream portion of the main channel 31, and a composite casing 33 which communicate with both of the main channel 31 and the bypass channel 32. In other words, three power generating diesel engines 25 are mounted, and an exhaust gas purification system constructed by the main channel 31, the bypass channel 32 and the composite casing 33 corresponds to each of the diesel engines 25.

The composite casing 33 is made of a heat resisting metal material, is structured as a rectangular tube shape, and is arranged above the second deck 14 on which each of the diesel engines 25 is arranged (in an upper portion side of the engine room 11). A NOx catalyst (not shown) is accommodated in the main channel 31 in an inner portion of the composite casing 33, the NOx catalyst corresponding to a selective catalyst reducer accelerating reduction of NOx in the exhaust gas of the diesel engine 25. The exhaust gas passes through the NOx catalyst in the main channel 31 so as to be purified. The bypass channel 32 is a channel for making the exhaust gas bypass the NOx catalyst. In other words, the exhaust gas moving in the bypass channel 32 does not pass through the NOx catalyst. The main channel 31 and the bypass channel 32 are combined in an exhaust gas outlet side of the composite casing 33.

A main side switch valve and a bypass side switch valve are provided in a branch portion of the main channel 31 and the bypass channel 32 in an exhaust gas inlet side of the composite casing 33, the main side switch valve and the bypass side switch valve corresponding to a channel switch member switching an exhaust gas moving direction to the main channel 31 or the bypass channel 32. In a state in which the main side switch valve is open (the bypass side switch valve is closed), the exhaust gas in the exhaust gas discharge pipe 30 is discharged out of the marine vessel 1 after passing through the main channel 31 within the composite casing 33 (the NOx catalyst) and being purified. In a state in which the bypass side switch valve is open (the main side switch valve is closed), the exhaust gas in the exhaust gas discharge pipe 30 bypasses the NOx catalyst without being purified and is discharged out of the marine vessel 1.

Figure 5:
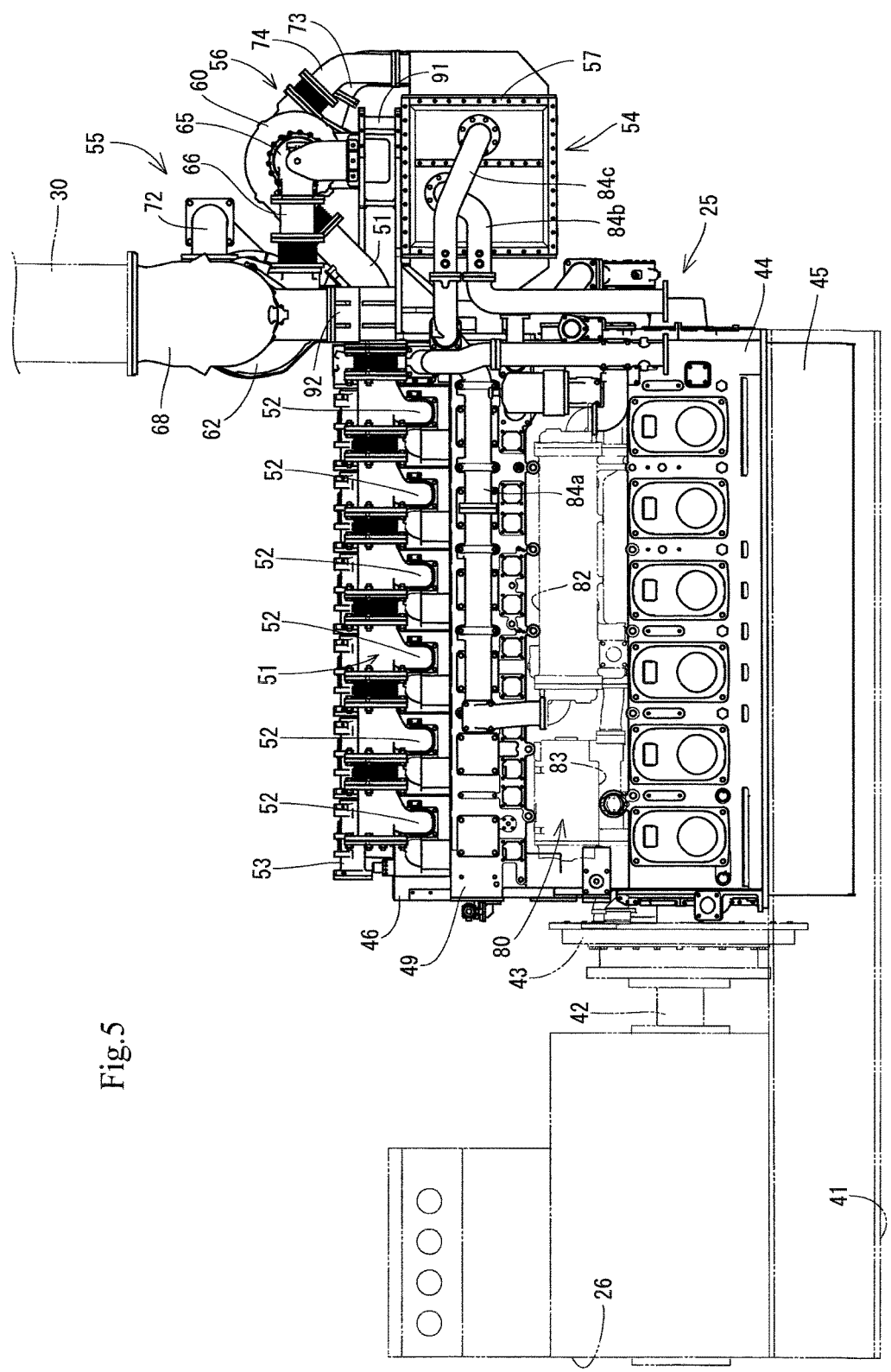
FIG. 5 is a side elevational view showing the intake and exhaust manifold side (the left side surface) of the same.
Figure 6:
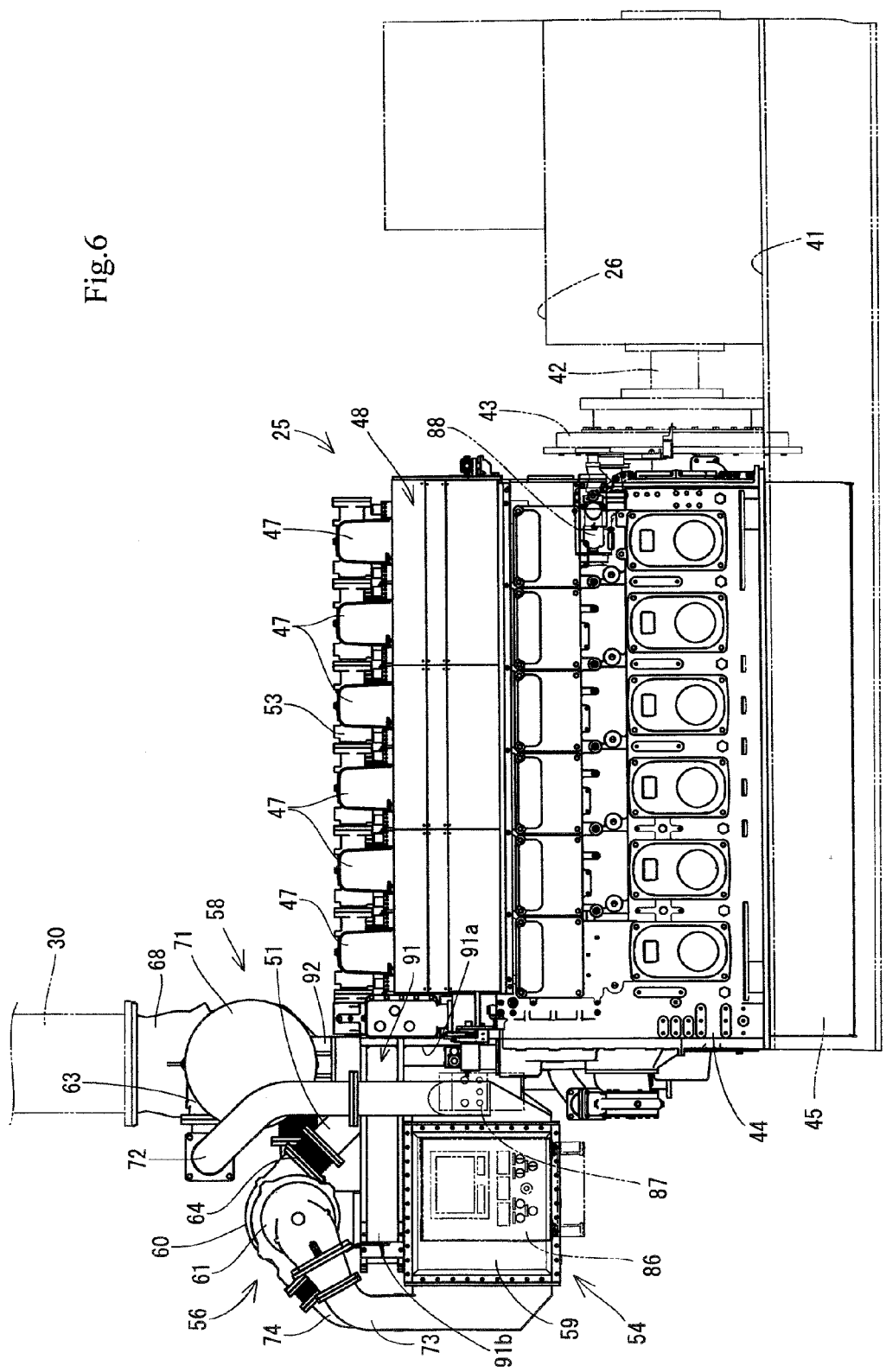
FIG. 6 is a side elevational view showing the fuel pump arrangement room side (the right side surface) of the same.

Next, a description will be given of the power generating diesel engine 25 and an exhaust gas discharge structure with reference to FIGS. 3 to 15. As shown in FIGS. 5 and 6, the power generating diesel engine 25 and the power generator 26 are mounted on a base frame 41. An output shaft (a crank shaft) 42 is protruded to one side of the diesel engine 25, a flywheel 43 is axially supported to the output shaft 42, the output shaft 42 is connected to the power generator 26, and the power generator 26 is driven by the diesel engine 25.

Further, as shown in FIGS. 3 to 10, the diesel engine 25 is provided with a cylinder block 44 for six cylinders which is mounted and fixed onto the base frame 41, an oil pan 45 which is installed in a lower surface side of the cylinder block 44 and serves as an engine oil tank, a cylinder head 46 which is arranged in a top surface side of the cylinder block 44, and a head cover 47 for six cylinders which is arranged in a top surface side of the cylinder head 46. A fuel pump arrangement room 48 is provided in one side surface in a longitudinal direction of the cylinder block 44 having a rectangular box shape, an intake manifold 49 is provided in the other side surface in the longitudinal direction of the cylinder block 44, and an exhaust manifold 51 is arranged in the other side surface in the longitudinal direction of the cylinder head 46 in an upper side of the intake manifold 49.

By the way, one side surface in the longitudinal direction (a cylinder installation width for six cylinders) of the cylinder block 44 in which the fuel pump arrangement room 48 is arranged is called as a front surface of the diesel engine 25, the other side surface in the longitudinal direction of the cylinder head 46 in which the intake manifold 49 and the exhaust manifold 51 are arranged is called as a back surface of the diesel engine 25, one side surface in a short direction (a cylinder installation width for one cylinder) of the cylinder block 44 in which the power generator 26 is arranged is called as a left side surface of the diesel engine 25, and the other side surface in the short direction of the cylinder block 44 is called as a right side surface of the diesel engine 25. Further, an intake valve and an exhaust valve (not shown) are attached to the cylinder head 46, opening and closing mechanisms for the intake valve and the exhaust valve are provided in an inner portion of the cylinder head cover 47, and a fuel piping, a fuel pump and a fuel pump drive shaft which are not shown are installed in the cylinder block 44 of the fuel pump arrangement room 48.

As shown in FIGS. 3 to 9, the fuel system auxiliary components such as the fuel pump are provided in the fuel pump arrangement room 48 in the front surface side of the diesel engine 25, and the intake and exhaust system auxiliary components such as the intake manifold 49 and the exhaust manifold 51 are provided in the side surfaces of the cylinder block 44 and the cylinder head 46 in the back surface side of the diesel engine 25. The fuel system auxiliary components and the intake and exhaust system auxiliary components are separately arranged in the front surface side and the back surface side of the diesel engine 25. Further, the exhaust manifold 51 has a cylinder connection pipe 52 which is communicated with the first to sixth cylinders of the diesel engine 25, and the exhaust manifold 51 is arranged in parallel above the intake manifold 49. In addition, an engine cooling water pipe 53 for cooling the diesel engine 25 is extended in parallel to the exhaust manifold 51 between the head cover 47 and the exhaust manifold 51. In other words, the exhaust manifold 51 between the cylinder head 46 and a high-pressure supercharger 56, and the engine cooling water pipe 53 are extended in parallel in one side of the head covers 47.

Further, as shown in FIGS. 3 to 11, a two-stage supercharger 55 connected to the intake manifold 49 and the exhaust manifold 51 is provided with the high-pressure supercharger 56 and a high-pressure side intercooler 57, and a low-pressure supercharger 58 and a low-pressure side intercooler 59. The high-pressure side intercooler 57 and the low-pressure side intercooler 59 are arranged adjacently to each other with comparting an inner portion of an intercooler main body 54 having a rectangular box shape.

Further, the high-pressure supercharger 56 has a high-pressure compressor 61 and a high-pressure turbine 60, and the low-pressure supercharger 58 has a low-pressure compressor 63 and a low-pressure turbine 62. An exhaust gas inlet 64 of the high-pressure turbine 60 is connected to the exhaust manifold 51, an exhaust gas inlet 67 of the low-pressure turbine 62 is connected to an exhaust gas outlet 65 of the high-pressure turbine 60 via a high-pressure exhaust gas pipe 66, and an exhaust gas intake side end portion of the exhaust gas discharge pipe 30 is connected to an exhaust gas outlet 68 of the low-pressure turbine 62.

According to the structure mentioned above, the exhaust gas of the power generating diesel engine 25 discharged out of the exhaust manifold 51 sequentially moves to the high-pressure turbine 60, the high-pressure exhaust gas pipe 66, and the low-pressure turbine 62, thereafter moves to the exhaust gas discharge pipe 30 from the exhaust gas outlet 68 of the low-pressure turbine 62, is purified in the composite casing 33 which is provided in the middle of the exhaust gas discharge pipe 30, and is discharged out of the ship. Further, the high-pressure compressor 61 is driven by the high-pressure turbine 60, and the low-pressure compressor 63 is driven by the low-pressure turbine 62.

Meanwhile, a supply air filter 71 is provided in a fresh air intake side of the low-pressure compressor 63, the low-pressure side intercooler 59 is connected to a fresh air delivery side of the low-pressure compressor 63 via a low-pressure fresh air passage pipe 72, a fresh air intake side of the high-pressure compressor 61 is connected to the low-pressure side intercooler 59 via a fresh air introduction pipe 73, and the high-pressure side intercooler 57 is connected to a fresh air delivery side of the high-pressure compressor 61 via a high-pressure fresh air passage pipe 74. The fresh air taken from the supply air filter 71 is pressurized by the low-pressure compressor 63, is next cooled by the low-pressure side intercooler 59, thereafter moves to the high-pressure compressor 61 from the low-pressure side intercooler 59, is further pressurized by the high-pressure compressor 61, is cooled by the high-pressure side intercooler 57, and is supplied to the intake manifold 49.

Further, there is provided an engine lubricating oil mechanism 80 which circulates the engine oil of the power generating diesel engine 25, as shown in FIG. 5. The engine lubricating oil mechanism 80 has an oil pump (not shown) which delivers the engine oil in the oil pan 45, an oil cooler 82 which cools the engine oil, and an oil filter 83 which purifies the engine oil. The oil cooler 82 and the oil filter 83 are firmly fixed in a single horizontal row to a side surface of the cylinder block 44 (a back surface of the diesel engine 25) in which the intake manifold 49 and the exhaust manifold 51 are arranged. The engine oil in the oil pan 45 is circulated to the cylinder block 44 or the cylinder head 46 via the oil cooler 82 and the oil filter 83.

As shown in FIG. 5, the intake manifold 49, the exhaust manifold 51, the oil cooler 82 and the oil filter 83 are arranged so as to be biased to an opposite side surface (a back surface side of the diesel engine 25) of the cylinder block 44 to one side surface (a front surface of the diesel engine 25) in the longitudinal direction of the cylinder block 44 in which the fuel pump arrangement room 48 is arranged. Further, a cooling water pump (not shown) is connected to the high-pressure side intercooler 57, the low-pressure side intercooler 59 and the oil cooler 82 via cooling water pipings 84*a*, 84*b* and 84*c*. In other words, the cooling water is circulated to the high-pressure side intercooler 57, the low-pressure side intercooler 59 and the oil cooler 82, thereby cooling the fresh air from the high-pressure turbine 60, the fresh air from the low-pressure, turbine 62 and the engine oil within the oil cooler 82.

Meanwhile, an engine control panel 86, a start and stop switch box 87 and an engine start device 88 are arranged so as to be biased to the side surface (the front surface side of the diesel engine 25) of the cylinder block 44 in which the fuel pump arrangement room 48 is arranged, as shown in FIG. 6. In other words, it is possible to execute the work for starting or stopping the diesel engine 25 without movement of an operator to the side direction (the front surface side) of the cylinder block 44 in which the fuel pump arrangement room 48 is arranged, and without being affected to a radiant heat from the exhaust manifold 51.

Next, a description will be given of an attachment structure of the two-stage supercharger 55 (the high-pressure supercharger 56 and the low-pressure supercharger 58) and the intercooler main body 54 (the high-pressure side intercooler 57 and the low-pressure side intercooler 59) with reference to FIGS. 10 to 15. As shown in FIGS. 10 to 15, the two-stage supercharger 55 and the intercooler main body 54 are arranged in a side surface (a right side surface of the cylinder block 44) facing to a side surface (a left side surface of the cylinder block 44) in an arrangement side of the power generator 26 in which the output shaft 42 protrudes, among the side surfaces of the cylinder block 44 of the power generating diesel engine 25. In other words, one end side of the output shaft 42 and the power generator 26 are arranged in the left side surface portion of the diesel engine 25, and the two-stage supercharger 55 and the intercooler main body 54 are arranged in the right side surface portion of the diesel engine 25.

As shown in FIGS. 10 to 15, there is provided a supercharger unit frame 91 to which the two-stage supercharger 55 and the intercooler main body 54 are attached. The supercharger unit frame 91 has a vertical portion 91*a* bonded and fixed to a right side surface of the cylinder block 44 in an opposite side to a left side surface in which the power generator 26 is arranged, and a horizontal portion 91*b* connected to an upper end side of the vertical portion in an L-shaped form. The vertical portion 91*a* is fastened and fixed to the right side surface of the cylinder block 44 approximately in a vertical posture, one end of the horizontal portion 91*b* is integrally connected to an upper end of the vertical portion 91*a*, and the other end of the horizontal portion 91*b* is approximately horizontally protruded in a direction of being away from the cylinder block 44. The vertical portion 91*a* and the horizontal portion 91*b* are integrally formed by combining a plurality of metal plates by a welding process.

Further, the high-pressure supercharger 56 and the low-pressure supercharger 58 are attached to a top surface side of the horizontal portion 91*b* of the supercharger unit frame 91 in which the vertical portion 91*a* is bonded and fixed to the one side surface (the right side surface) of the diesel engine 25. The low-pressure supercharger 58 is arranged so as to be close to the right side surface of the diesel engine 25, and the high-pressure supercharger 56 is arranged so as to be away from the right side surface of the diesel engine 25. In other words, the low-pressure supercharger 58 is arranged in a top surface side of an end portion of the horizontal portion 91*b* connected to an upper end of the vertical portion 91*a* among the top surface side of the horizontal portion 91*b*, and the high-pressure supercharger 56 is arranged in the top surface side of the end portion of the horizontal portion 91*b* which is away from the right side surface of the diesel engine 25, among the top surface side of the horizontal portion 91b. Comparing an outer shape and an empty weight of the high-pressure supercharger 56 with an outer shape and an empty weight of the low-pressure supercharger 58, the high-pressure supercharger 56 is small and light, and the low-pressure supercharger 58 is large and heavy.

Meanwhile, the top surface of the intercooler main body 54 is bonded and fixed to a lower surface of the horizontal portion 91b of the supercharger unit frame 91, and the intercooler main body 54 is attached to the lower surface side of the horizontal portion 91b in a suspended posture, thereby lowering the temperature of the supplied air (the fresh air) delivered from the low-pressure supercharger 58 or the high-pressure supercharger 56 by the low-pressure side intercooler 59 or the high-pressure side intercooler 57 of the intercooler main body 54. In addition, a cradle frame 92 is firmly fixed to the top surface side of the horizontal portion 91b to which an upper end portion of the vertical portion 91a is connected, among the top surface side of the horizontal portion 91b of the supercharger unit frame 91, the low-pressure supercharger 58 is mounted on the cradle frame 92, and one end portion of the exhaust manifold 51 closer to the exhaust gas inlet 64 of the high-pressure compressor 61 is extended in a penetrating manner to the lower surface side of the low-pressure supercharger 58 via a space between the horizontal portion 91b and the cradle frame 92, among one end portion of the exhaust manifold 51 which derives the exhaust gas of the engine 25 to the high-pressure supercharger 56. In other words, the exhaust manifold 51 can be extended at the shortest distance between the cylinder block 44 and the high-pressure supercharger 56 without bypassing an externally lateral side of the low-pressure supercharger 58 which is arranged between the cylinder block 44 and the high-pressure supercharger 56.

Further, a fresh air introduction passage 91c is provided in the vertical portion 91a which is bonded and fixed to the right side surface of the cylinder block 44, the cylinder block 44 and the high-pressure side intercooler 57 are bonded by the vertical portion 91a, and an inlet of the end portion of the intake manifold 49 is connected to the fresh air outlet 57a of the high-pressure side intercooler 57 via the fresh air introduction passage 91c, thereby feeding and supplying the fresh air of the high-pressure side intercooler 57 to the intake manifold 49.

As shown in FIGS. 3 to 10, in the engine device in which the high-pressure supercharger 56 corresponding to the first supercharger and the low-pressure supercharger 58 corresponding to the second supercharger are arranged in series in the exhaust gas discharge channel of the diesel engine 25, the high-pressure supercharger 56 and the low-pressure supercharger 58 are arranged in the one side surface of the diesel engine 25, the low-pressure supercharger 58 is arranged so as to be close to the one side surface of the diesel engine 25, and the high-pressure supercharger 56 is arranged so as to be away from the one side surface of the diesel engine 25. As a result, the low-pressure supercharger 58 which is larger in size and is heavier than the high-pressure supercharger 56 can be stably installed between the diesel engine 25 and the high-pressure supercharger 56, and it is possible to simplify the structure for supporting the high-pressure supercharger 56 and the low-pressure supercharger 58. In addition, the air supply piping (such as the fresh air introduction pipe 73) in the high-pressure supercharger 56 side having the higher supply air temperature can be installed so as to be away from the one side surface of the diesel engine 25, and the air supply piping (such as the vertical portion 91a of the supercharger unit frame 91) in the low-pressure supercharger 58 side having the lower supply air temperature can be supported so as to be close to the one side surface of the diesel engine 25. As a result, it is possible to simplify the supply air cooling structure of the diesel engine 25. It is possible to collectively attach the auxiliary component such as the cooling water circulation pump or the engine oil circulation pump to the lower side space of each of the superchargers 56 and 58, and to improve a maintenance workability of each of the auxiliary components.

As shown in FIGS. 10 to 15, the vertical portion 91a of the supercharger unit frame 91 is bonded and fixed to the one side surface of the diesel engine 25, and the high-pressure supercharger 56 and the low-pressure supercharger 58 are attached to the top surface side of the horizontal portion 91b of the supercharger unit frame 91. As a result, the low-pressure supercharger 58 can be arranged in the top surface side near the vertical portion 91a of the supercharger unit frame 91 among the top surface side of the horizontal portion 91b of the supercharger unit frame 91, and it is possible to simplify the structure body for supporting the supercharger unit frame 91 while securing a support rigidity of the high-pressure supercharger 56 and the low-pressure supercharger 58.

As shown in FIGS. 10 to 15, the structure is provided with the intercooler main body 54 corresponding to the intercooler which lowers the supply air temperature of the high-pressure supercharger 56 and the low-pressure supercharger 58, the vertical portion 91a of the supercharger unit frame 91 is bonded and fixed to the one side surface of the diesel engine 25, and the intercooler main body 54 is attached to the lower surface side of the horizontal portion 91b of the supercharger unit frame 91. As a result, the one side surface of the intercooler main body 54 can be faced to the one side surface of the diesel engine 25 as the vertical portion 91a of the supercharger unit frame 91 being therebetween, a part of the supercharger unit frame 91 can be utilized as a piping which connects the intake manifold 49 of the diesel engine 25 and the fresh air outlet 57a of the intercooler main body 54, and it is possible to easily achieve simplification of the air supply piping or reduction of the supply air resistance.

As shown in FIGS. 10 to 15, the structure is provided with the exhaust manifold 51 corresponding to the exhaust pipe which derives the exhaust gas of the diesel engine 25 to the high-pressure supercharger 56, the one end portion of the horizontal portion 91b of the supercharger unit frame 91 is connected in the L-shaped manner to the upper end side of the vertical portion 91a of the supercharger unit frame 91, the cradle frame 92 is firmly fixed to the top surface side of the horizontal portion 91b of the supercharger unit frame 91 to which the vertical portion 91a of the supercharger unit frame 91 is connected, the low-pressure supercharger 58 is mounted on the cradle frame 92, and the exhaust manifold 51 is extended between the horizontal portion 91b of the supercharger unit frame 91 and the cradle frame 92. As a result, it is possible to form the exhaust manifold 51 for connecting the high-pressure supercharger 56 to the diesel engine 25 linearly, it is possible to reduce the exhaust gas resistance between the diesel engine 25 and the high-pressure supercharger 56, and it is possible to simply structure the exhaust conduit between the diesel engine 25 and the high-pressure supercharger 56.

Figure 3:
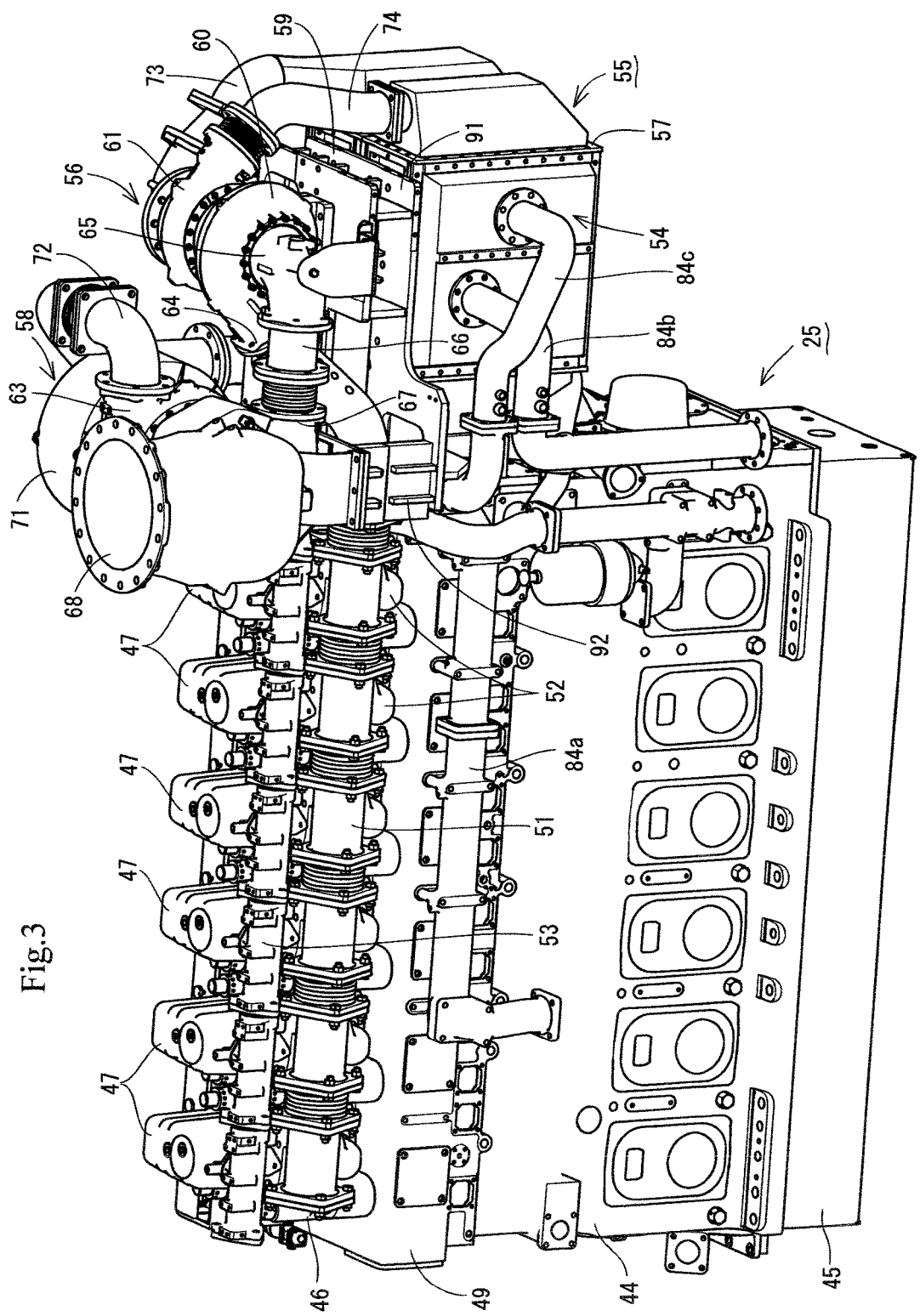
FIG. 3 is a perspective view showing an intake and exhaust manifold side (a left side surface) of a diesel engine.
Figure 4:
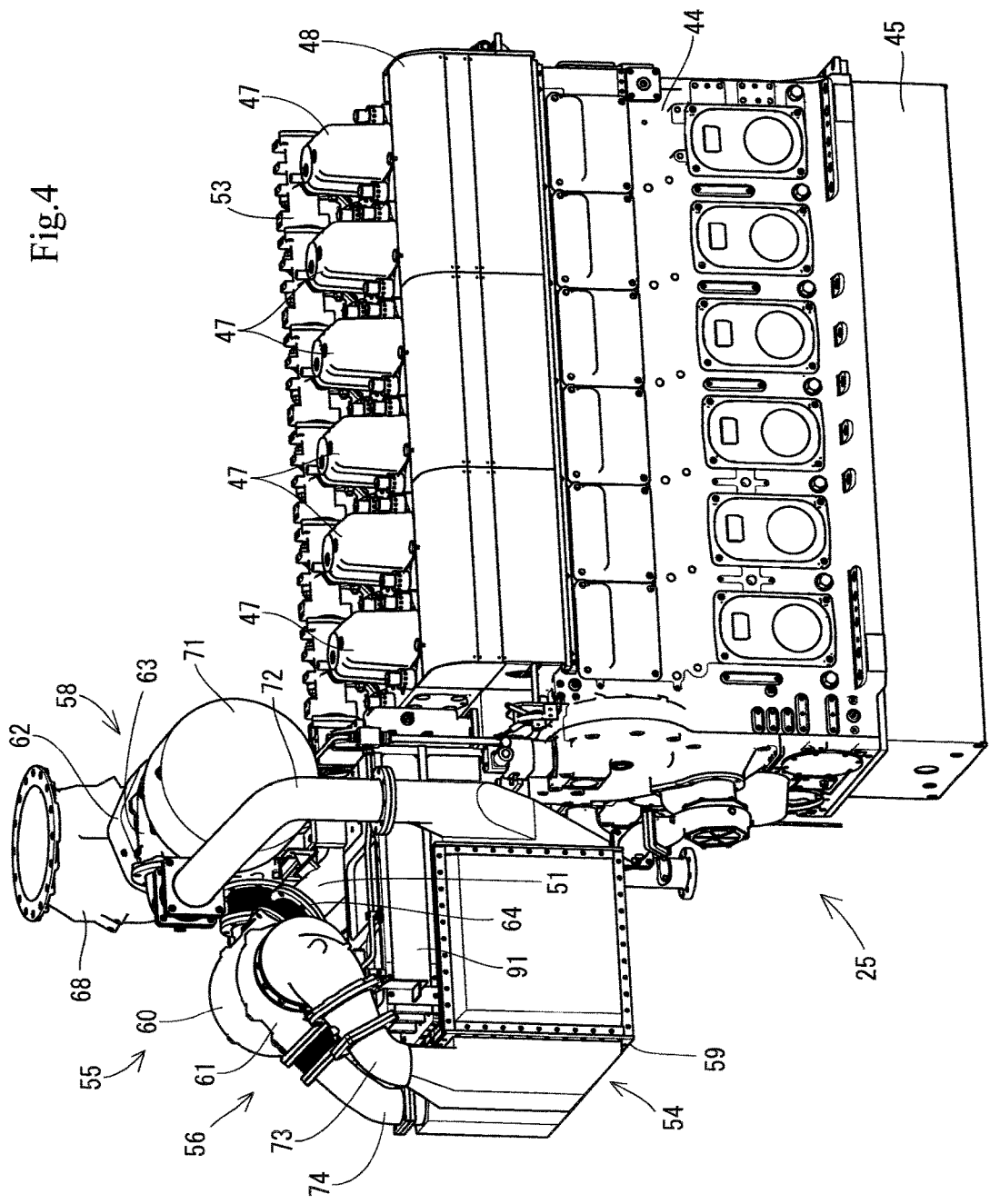
FIG. 4 is a perspective view showing a fuel pump arrangement room side (a right side surface) of the same.
Figure 7:
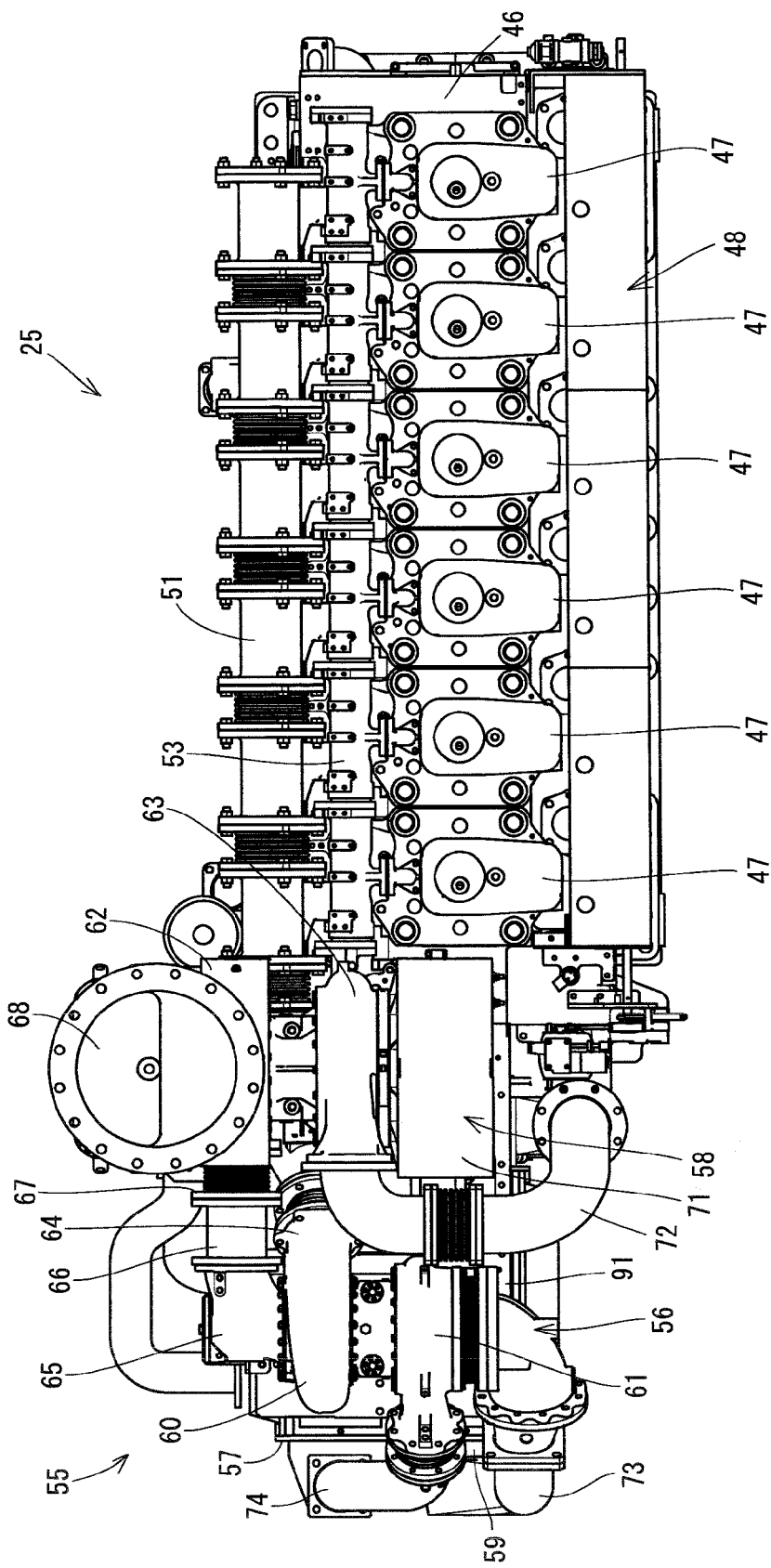
FIG. 7 is a plan view of the same.
Figure 8:
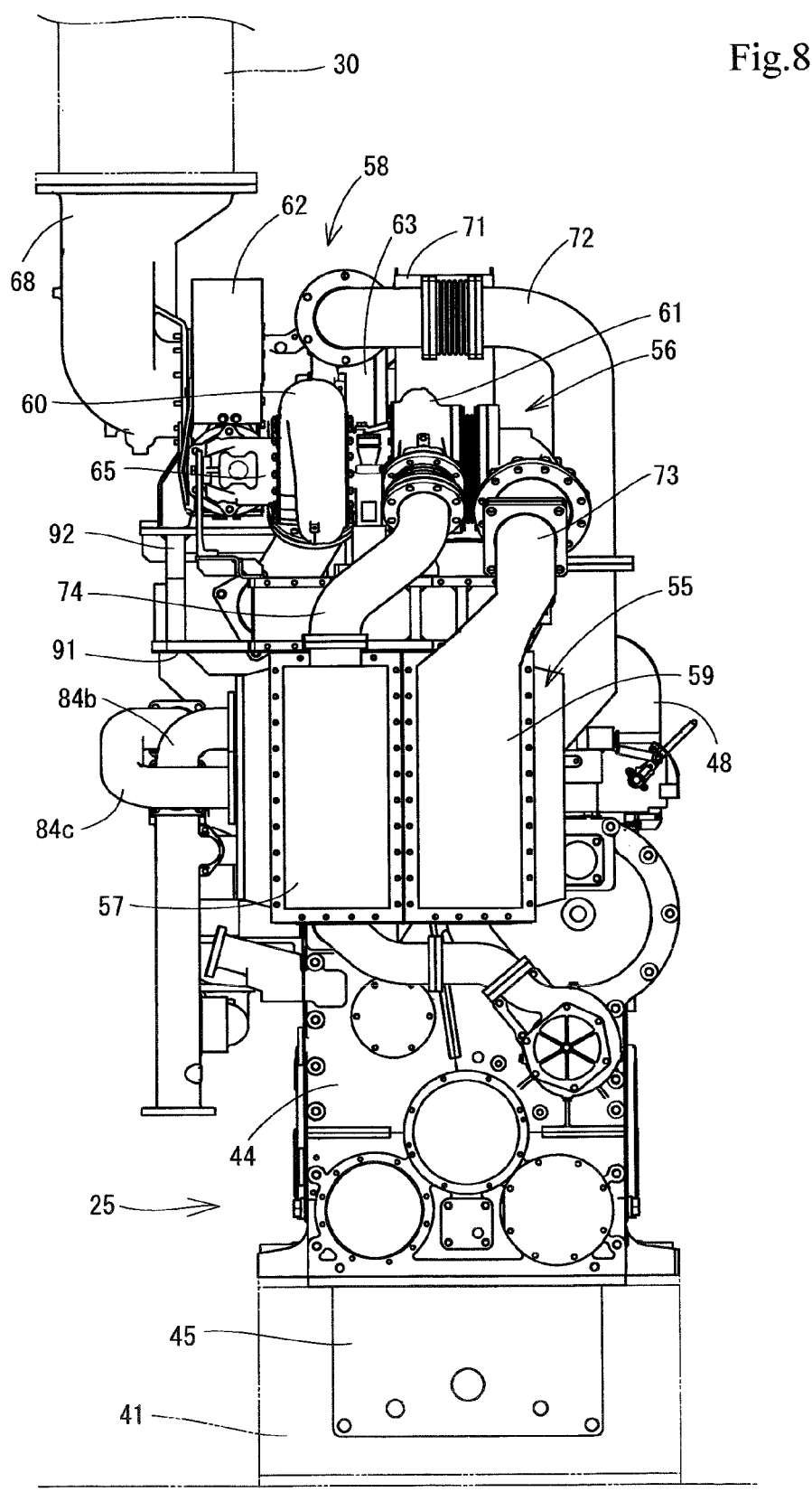
FIG. 8 is a side elevational view showing a supercharger installation side (a back surface) of the same.
Figure 9:
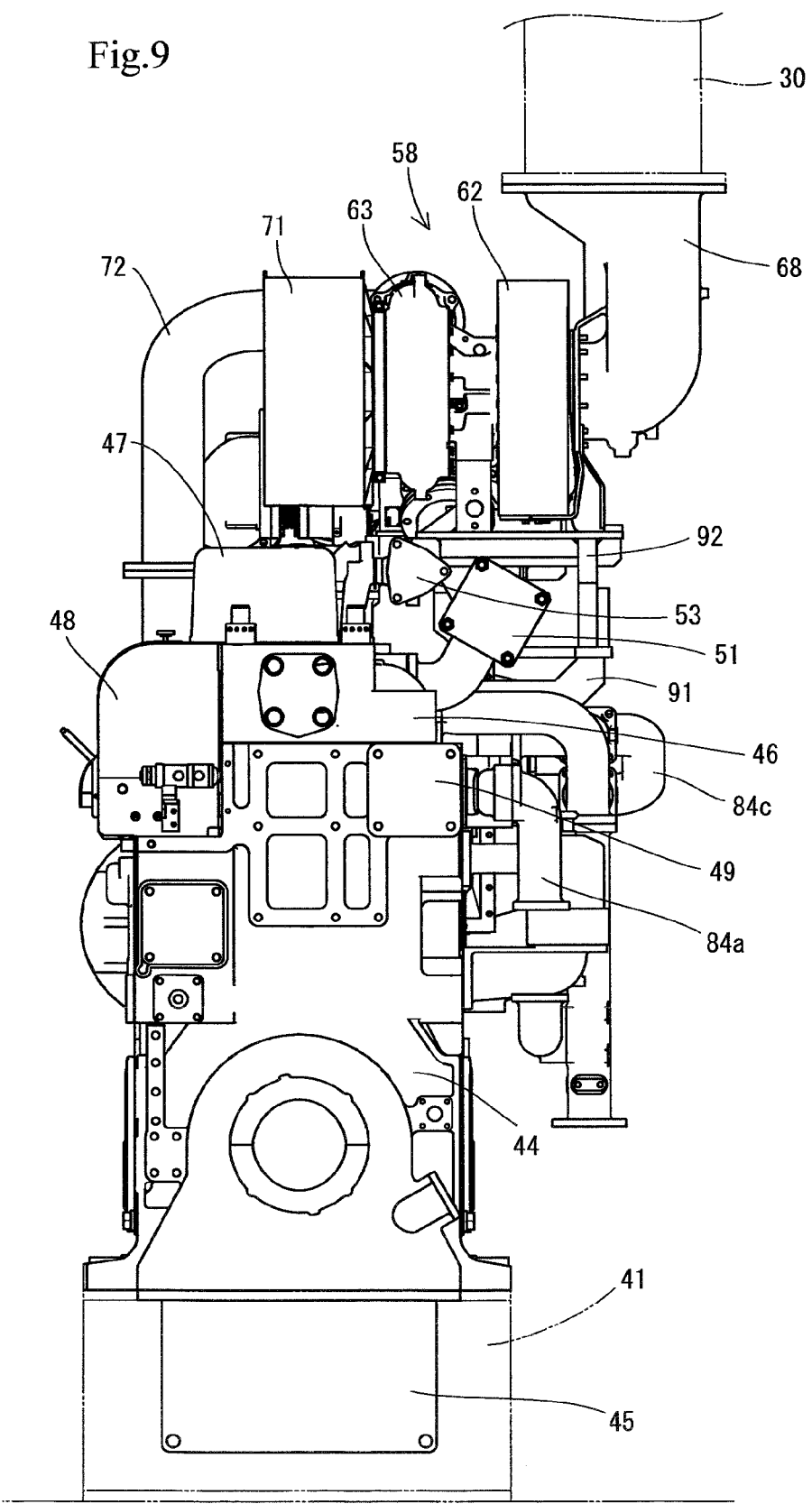
FIG. 9 is a side elevational view showing a power generator installation side (a front surface) of the same.
Figure 10:
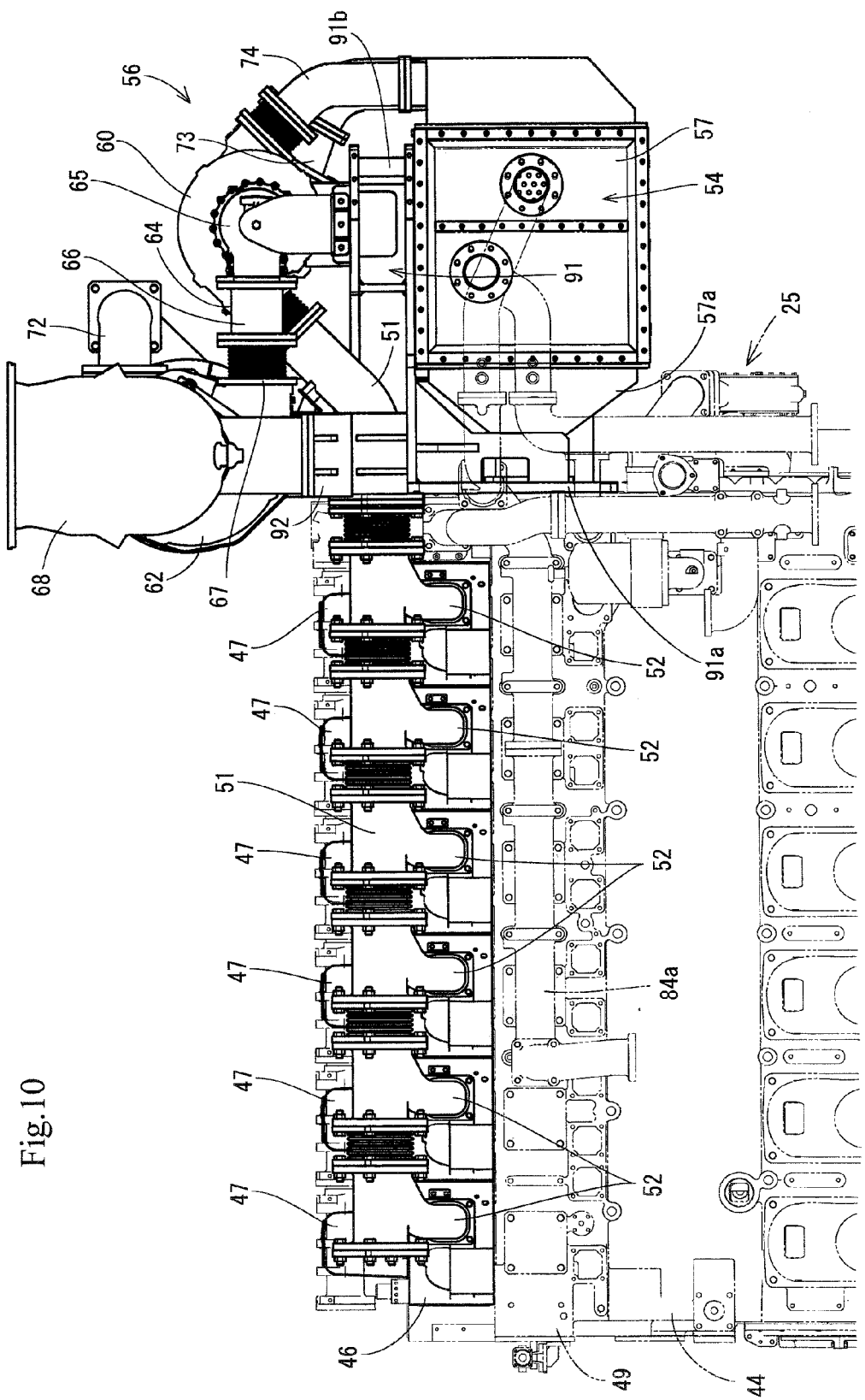
FIG. 10 is a side elevational view showing an intake and exhaust structure of the same.
Figure 11:
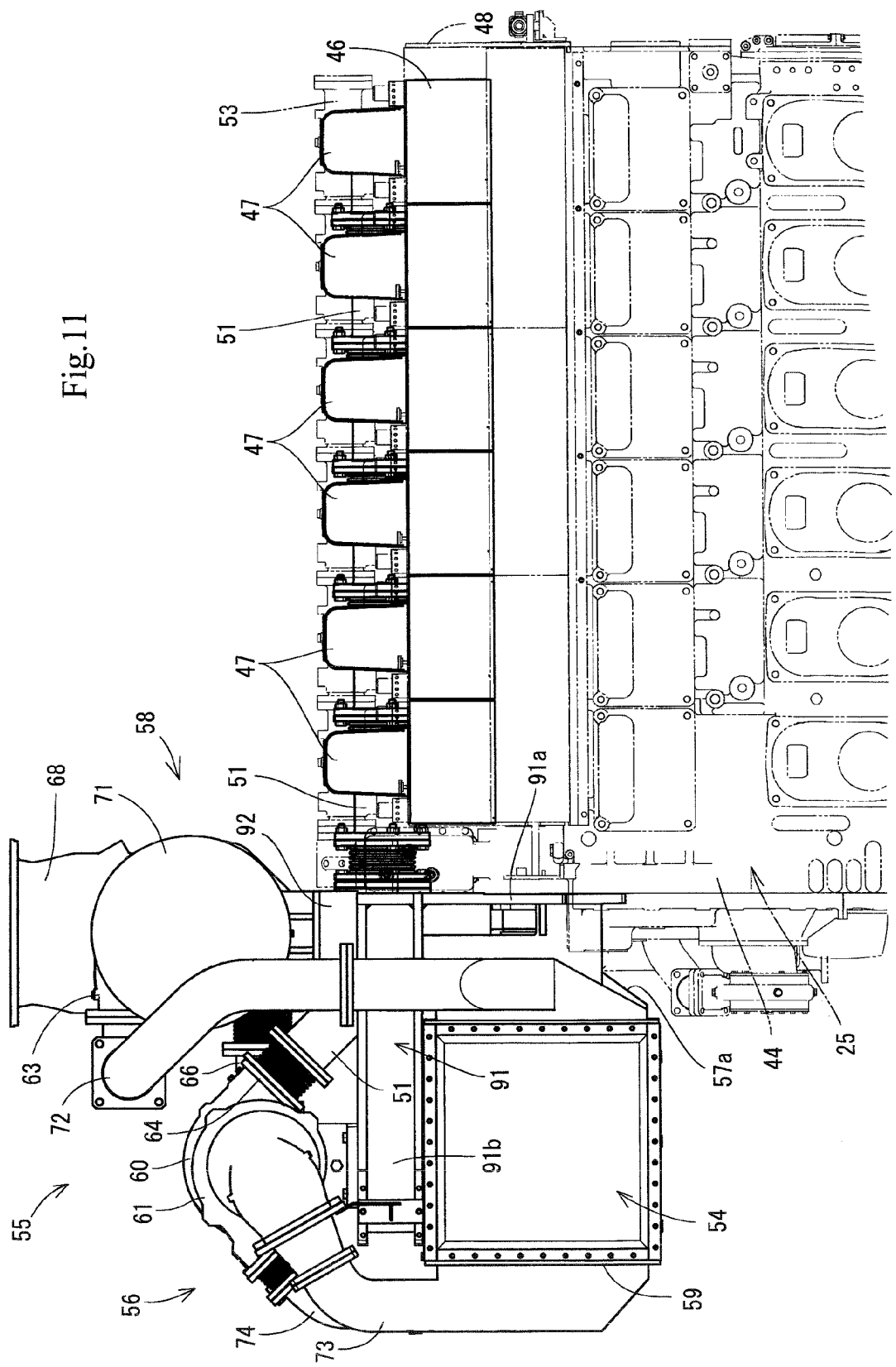
FIG. 11 is a side elevational view of the intake and exhaust structure as seen from the fuel pump arrangement room side of the same.
Figure 12:
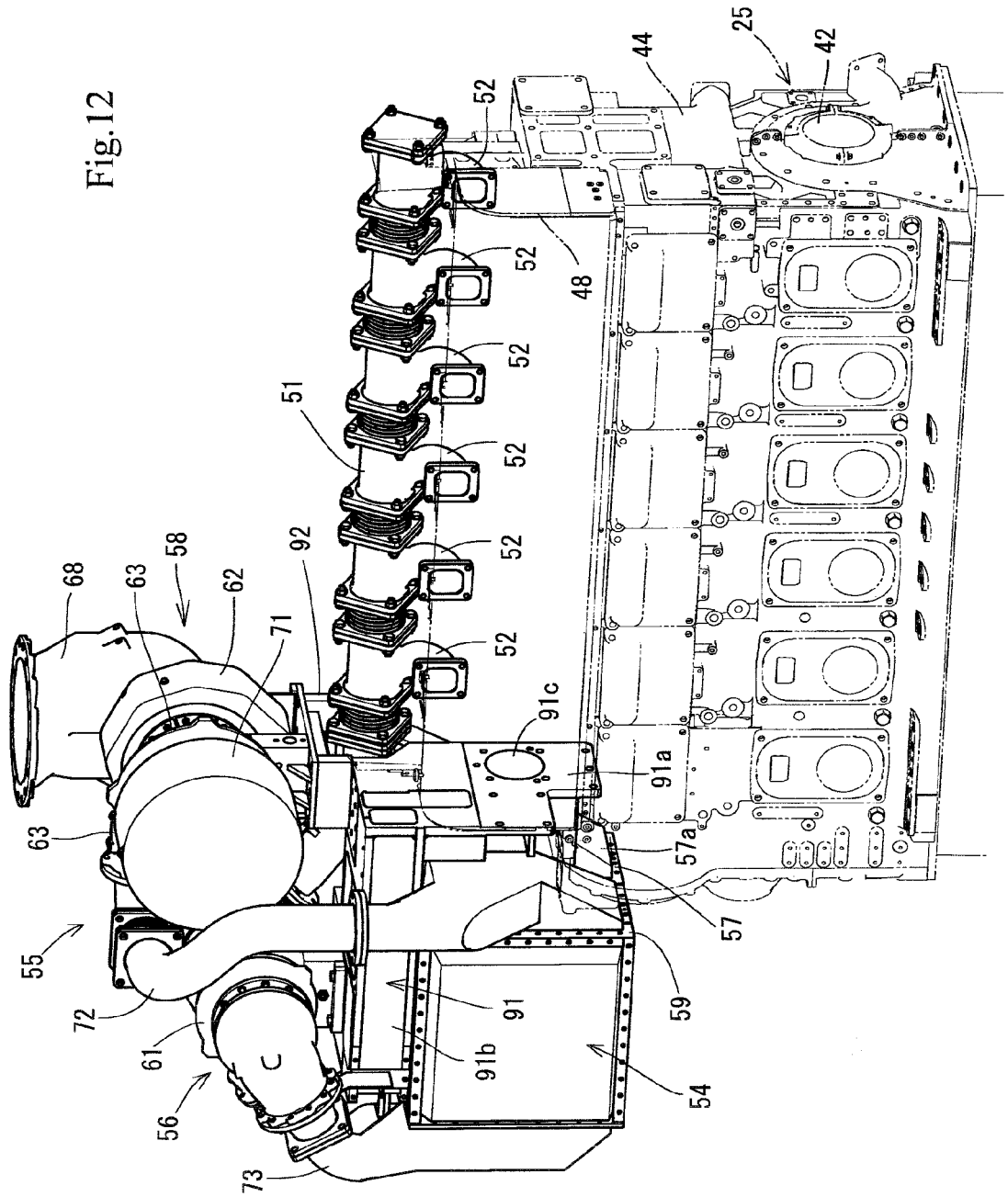
FIG. 12 is a perspective view of a supercharger as seen from the fuel pump arrangement room side of the same.
Figure 13:
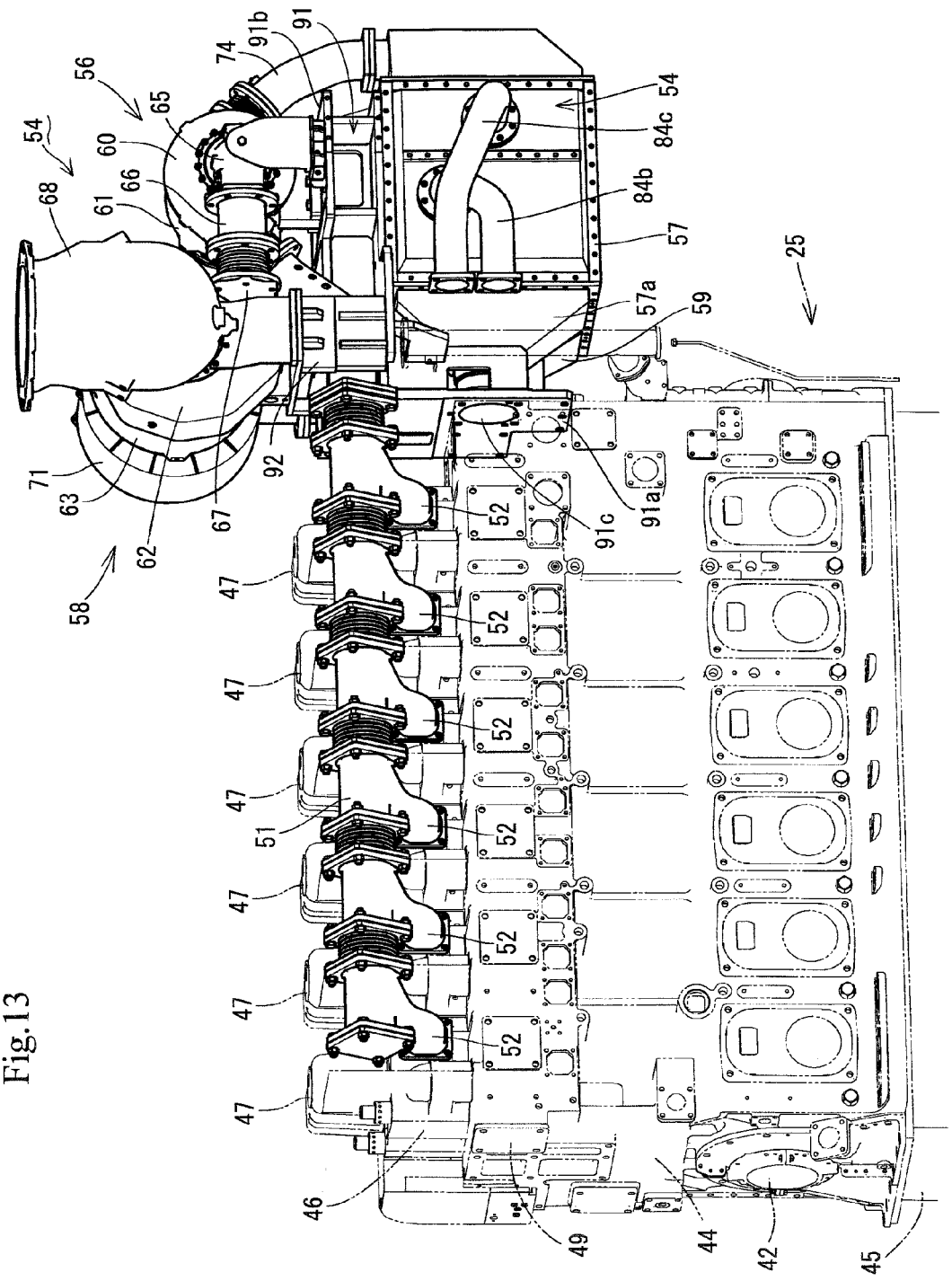
FIG. 13 is a perspective view of the supercharger as seen from the fuel pump arrangement room side of the same.
Figure 14:
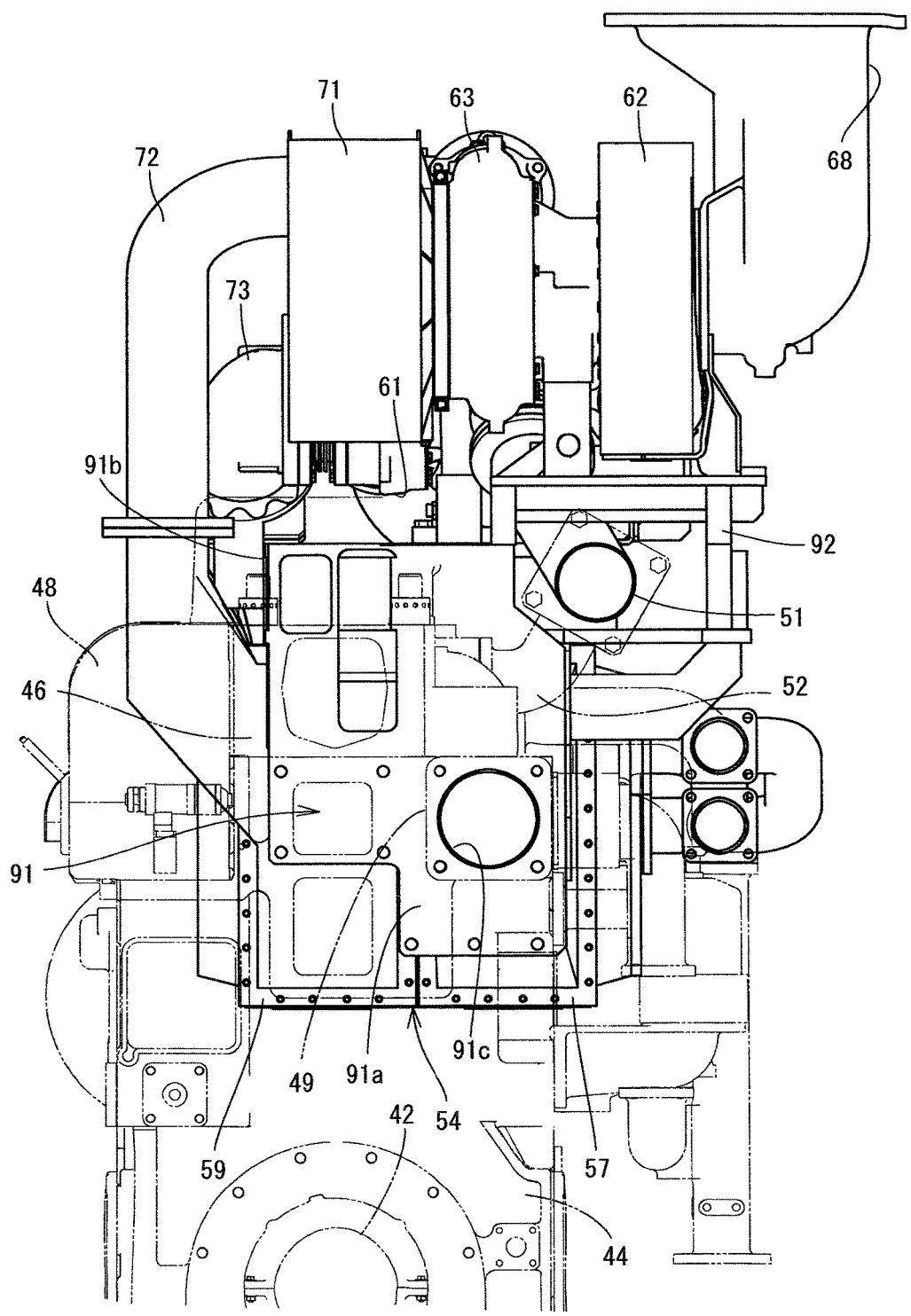
FIG. 14 is an explanatory view of a second supercharger and a supercharger unit frame attachment structure of the same.
Figure 15:
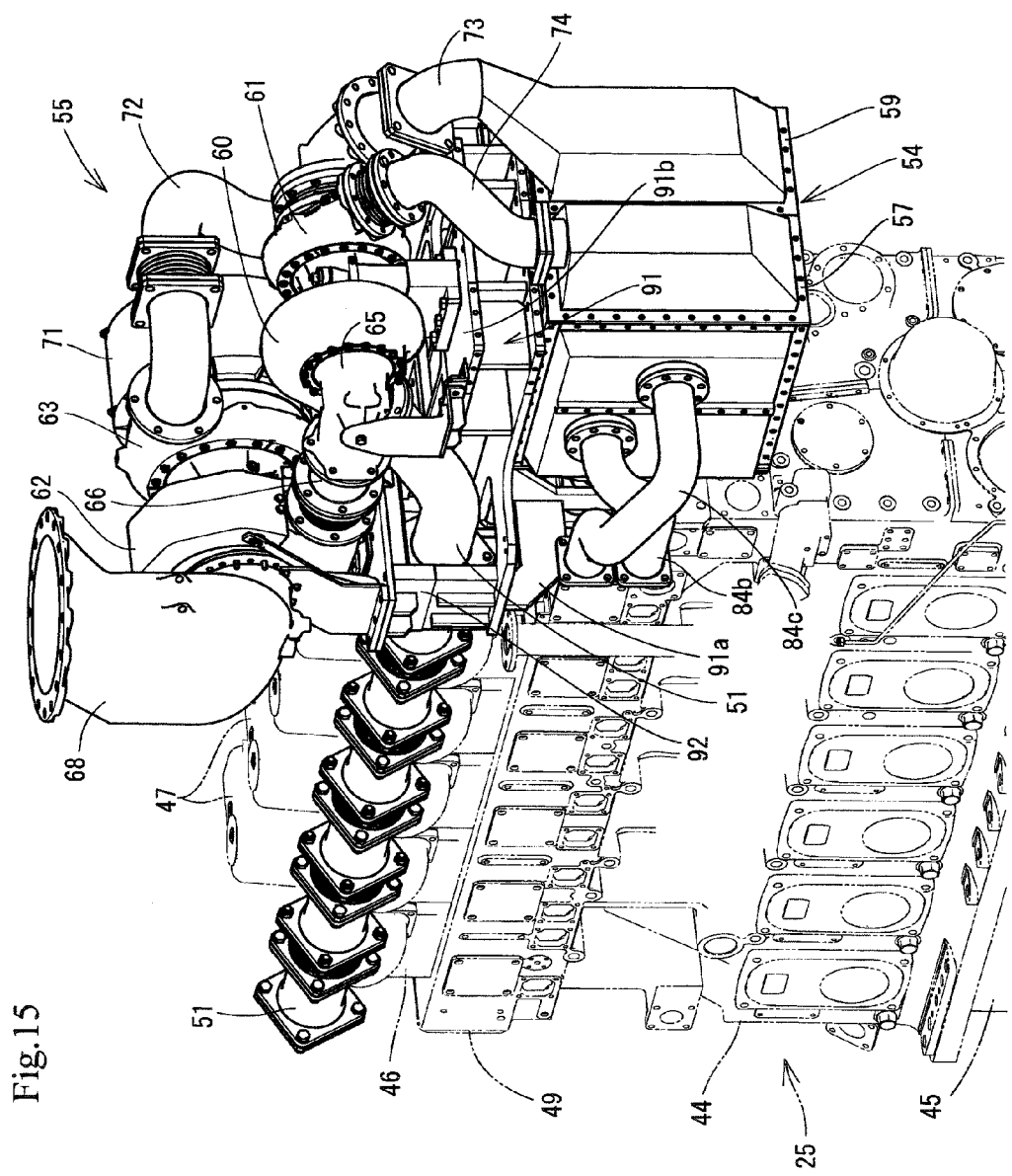
FIG. 15 is a perspective view of the supercharger as seen from an installation side of an intercooler of the same.

As shown in FIGS. 3 and 7, the exhaust manifold 51 corresponding to the exhaust pipe between the diesel engine 25 and the high-pressure supercharger 56, and the engine cooling water pipe 53 corresponding to the cooling water piping are extended in parallel to the one side of the head covers 47. As a result, it is possible to easily install, for example, the oil filter 83 or the oil cooler 82 by utilizing the diesel engine 25 side surface in the one side of the head covers 47 in which the exhaust manifold 51 and the engine cooling water pipe 53 are arranged as well as the exhaust manifold 51 and the engine cooling water pipe 53 can be compactly installed to the one side of the head covers 47. It is possible to arrange the fuel pump arrangement room 48, the engine control panel 86, the start and stop switch box 87 and the engine start device 88 in the side surface of the diesel engine 25 in the other side of the head covers 47, and it is possible to easily secure a working space for starting or stopping the diesel engine 25.

The high-pressure supercharger 56 and the low-pressure supercharger 58 may be integrally combined and arranged in the side surface in the one side of the diesel engine 25. Further, the dynamic pressure type exhaust manifold 51 may be formed by a plurality of exhaust manifolds, for example, a first exhaust manifold which is communicated with a first cylinder, a fourth cylinder and a fifth cylinder of the diesel engine 25, and a second exhaust manifold which is communicated with a second cylinder, a third cylinder and a sixth cylinder of the diesel engine 25.

REFERENCE SIGNS LIST

25 Power generating diesel engine
47 Head cover
49 Intake manifold
51 Exhaust manifold (exhaust pipe)
53 Engine cooling water pipe (cooling water piping)
54 Intercooler main body (intercooler)
56 High-pressure supercharger (first supercharger)
57a Fresh air outlet
58 Low-pressure supercharger (second supercharger)
73 Fresh air introduction pipe (supply air cooling piping)
91 Supercharger unit frame
91a Vertical portion (supply air cooling piping)
91b Horizontal portion
92 Cradle frame

The invention claimed is:

1. An engine device comprising:
a first supercharger;
a second supercharger, wherein the first and second superchargers are arranged in series in an exhaust gas discharge channel of an engine, the first and second superchargers are arranged on one side surface of the engine, the second supercharger is arranged so as to be close to the one side surface of the engine, and the first supercharger is arranged so as to be away from the one side surface of the engine; and
an intercooler configured to lower a supply air temperature of the first supercharger and the second supercharger, wherein a vertical portion of a supercharger unit frame is bonded and fixed to the one side surface of the engine, and the intercooler is attached to a lower surface side of a horizontal portion of the supercharger unit frame.

2. The engine device of claim 1, wherein:
the first supercharger comprises high-pressure supercharger;
the second supercharger comprises low-pressure supercharger; and
the low-pressure supercharger is positioned closer to the one side surface of the engine than the high-pressure supercharger.

3. The engine device of claim 1, wherein the supercharger unit frame is connected to the one side surface of the engine, and wherein the one side surface comprises a rear side surface.

4. An engine device comprising:
a first supercharger;
a second supercharger, wherein the first and second superchargers are arranged in series in an exhaust gas discharge channel of an engine, the first and second superchargers are arranged on one side surface of the engine, the second supercharger is arranged so as to be close to the one side surface of the engine, and the first supercharger is arranged so as to be away from the one side surface of the engine, a vertical portion of a supercharger unit frame is bonded and fixed to the one side surface of the engine, and the first supercharger and the second supercharger are attached to a top surface side of a horizontal portion of the supercharger unit frame; and
an exhaust pipe configured to direct exhaust gas of the engine to the first supercharger, wherein one end portion of the horizontal portion of the supercharger unit frame is connected in an L-shaped manner to an upper end side of the vertical portion of the supercharger unit frame, a cradle frame is fixed to a top surface side of the horizontal portion of the supercharger unit frame to which the vertical portion of the supercharger unit frame is connected, the second supercharger is mounted on the cradle frame, and the exhaust pipe is extended between the horizontal portion of the supercharger unit frame and the cradle frame.

5. The engine device of claim 4, wherein:
the first supercharger comprises high-pressure supercharger;
the second supercharger comprises low-pressure supercharger; and
the low-pressure supercharger is positioned closer to the one side surface of the engine than the high-pressure supercharger.

6. An engine device comprising:
a high-pressure supercharger having a high-pressure turbine and a high-pressure compressor;
a low-pressure supercharger having a low-pressure turbine and a low-pressure compressor;
wherein the high-pressure supercharger and the low-pressure supercharger are arranged in series in an exhaust gas discharge channel of an engine; and
wherein the high-pressure supercharger and the low-pressure supercharger are arranged on one side surface of the engine, the low-pressure supercharger is arranged to be close to the one side surface of the engine, and the high-pressure supercharger is arranged to be away from the one side surface of the engine such that the low-pressure supercharger is positioned closer to the one side surface of the engine than the high-pressure supercharger; and
a supercharger unit frame comprising a vertical portion and a horizontal portion, the vertical portion coupled to the one side surface of the engine;
wherein at least one of:
the high-pressure supercharger is attached to a top surface side of the horizontal portion of the supercharger unit frame;
the low-pressure supercharger is attached to the top surface side of the horizontal portion of the supercharger unit frame; and an intercooler is attached to a lower surface side of the horizontal portion and is coupled to the low-pressure supercharger and the high-pressure supercharger.

7. The engine device according to claim 6, wherein the high-pressure supercharger and the low-pressure supercharger are attached to the top surface side of the horizontal portion of the supercharger unit frame.

8. The engine device according to claim 7,
wherein the intercooler is coupled to the low-pressure supercharger and high-pressure supercharger.

9. The engine device according to claim 7, further comprising:
an exhaust pipe configured to enable gas to flow from the engine to the high-pressure supercharger, wherein one end portion of the horizontal portion of the supercharger unit frame is connected in an L-shaped manner to an upper end side of the vertical portion of the supercharger unit frame; and
a cradle frame coupled to the top surface side of the horizontal portion of the supercharger unit frame to which the vertical portion of the supercharger unit frame is connected,
wherein the low-pressure supercharger is couple to the cradle frame, and
wherein the exhaust pipe is extended between the horizontal portion of the supercharger unit frame and the cradle frame.

10. The engine device according to claim 6, further comprising:
an exhaust pipe between the engine and the high-pressure supercharger;
a cooling water pipe; and
head covers, wherein the exhaust pipe and the cooling water pipe are extended in parallel to one side of the head covers.

11. The engine device according to claim 6, wherein the high-pressure supercharger and the low-pressure supercharger are operably connected with each other through a pipe.

12. The engine device according to claim 1, further comprising:
an exhaust manifold of the engine;
a high-pressure exhaust gas pipe; and
an exhaust gas discharge pipe;
wherein:
an exhaust gas inlet of the high-pressure turbine is connected to the exhaust manifold of the engine;
an exhaust gas inlet of the low-pressure turbine is connected to an exhaust gas outlet of the high-pressure turbine via the high-pressure exhaust gas pipe; and
an exhaust gas intake side end portion of the exhaust gas discharge pipe is connected to an exhaust gas outlet of the low-pressure turbine.

13. The engine device according to claim 12, wherein:
the high-pressure turbine is configured to drive the high-pressure compressor; and
the low-pressure turbine is configured to drive the low-pressure compressor.

14. The engine device of claim 12, wherein:
the exhaust gas outlet of the high-pressure turbine is open towards a first side of the engine; and
the exhaust gas inlet of the low-pressure turbine is open towards a second side of the engine that is different from the first side of the engine.

15. The engine device of claim 6, wherein:
an exhaust gas outlet of the high-pressure turbine is positioned on a first side of the high-pressure turbine; and
a second side of the high-pressure turbine that is opposite the first side is coupled to the high-pressure compressor.

16. The engine device of claim 6, wherein:
an exhaust gas outlet of the high-pressure turbine is positioned on a first side of the high-pressure supercharger; and
a fresh air intake side of the high-pressure compressor is positioned on a second side of the high-pressure supercharger that is opposite the first side of the high-pressure supercharger.

17. The engine device of claim 6, wherein the high-pressure supercharger is attached to the top surface side of the horizontal portion of the supercharger unit frame.

18. The engine device of claim 6, wherein the low-pressure supercharger is attached to the top surface side of the horizontal portion of the supercharger unit frame.

19. The engine device of claim 6, wherein the intercooler is attached to the lower surface side of the horizontal portion and is coupled to the low-pressure supercharger and the high-pressure supercharger.

20. The engine device of claim 19, wherein the high-pressure supercharger is attached to the top surface side of the horizontal portion of the supercharger unit frame.

* * * * *